United States Patent [19]

O'Donnell et al.

[11] 3,827,036

[45] July 30, 1974

[54] MAGNETIC BUBBLE DOMAIN SYSTEM

[75] Inventors: Cedric F. O'Donnell, Fullerton; George R. Pulliam, Anaheim, both of Calif.

[73] Assignee: Rockwell International Corporation, El Segundo, Calif.

[22] Filed: Apr. 23, 1973

[21] Appl. No.: 353,265

Related U.S. Application Data

[63] Continuation of Ser. No. 123,642, March 12, 1971, abandoned.

[52] U.S. Cl. 340/174 TF, 340/174 VA, 340/174 SR

[51] Int. Cl. .......................... G11c 11/14, G11c 19/00

[58] Field of Search ................ 340/174 TF, 174 VA

[56] References Cited

UNITED STATES PATENTS

| | | | |
|---|---|---|---|
| 3,540,019 | 11/1970 | Bobeck | 340/174 TF |
| 3,636,531 | 1/1972 | Copeland | 340/174 TF |
| 3,641,518 | 9/1970 | Copeland | 340/174 TF |
| 3,715,736 | 2/1973 | O'Donnell et al. | 340/174 TF |
| 3,717,853 | 2/1973 | O'Donnell et al. | 340/174 TF |
| 3,735,145 | 5/1973 | Heinz | 340/174 TF |

*Primary Examiner*—Vincent P. Canney
*Attorney, Agent, or Firm*—L. Lee Humphries; H. Frederick Hamann

[57] ABSTRACT

A magnetic bubble domain system comprising one or more channels or paths of magnetic bubble domain material on a supporting substrate is described. The channel of magnetic bubble domain material is defined by grooves extending partially into a thin film of the magnetic bubble domain material. The grooves extend through the film to the extent of 1 to 99 percent of the thickness of the film. The movement of bubble domains along a channel is effected by the repulsive or interaction forces between bubble domains which are present in a channel when a bubble domain is formed or propagated near another bubble domain.

6 Claims, 1 Drawing Figure

PATENTED JUL 30 1974
3,827,036
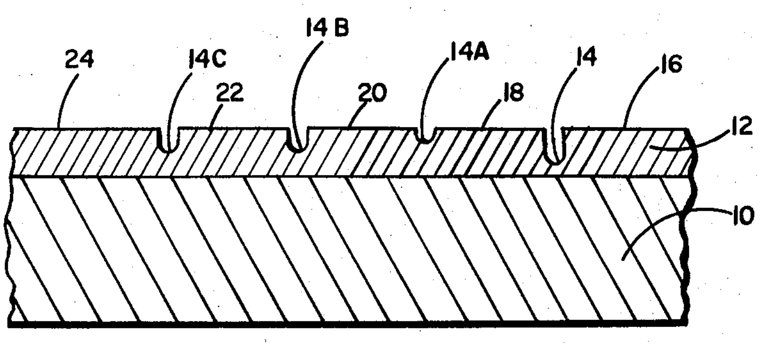
INVENTORS
CEDRIC F. O'DONNELL
GEORGE R. PULLIAM
BY Joseph E. Kieninger
ATTORNEY

MAGNETIC BUBBLE DOMAIN SYSTEM

This is a continuation of application Ser. No. 123,642, filed Mar. 12, 1971, now abandoned.

FIELD OF THE INVENTION

This invention relates to magnetic bubble domains and more particularly to a system for the propagation of magnetic bubble domains.

BRIEF DESCRIPTION OF PRIOR ART

Magnetic domains and the propagation thereof in a magnetic medium are well known in the art and are described in U.S. Pat. No's. 3,460,116; 3,470,546; 3,508,225; and others. In general, these patents describe the movement of single wall bubble domains in a shift register by the use of narrow metal patterns to control the positions of the bubbles. The methods described in these patents attempt to minimize the repulsive or interaction forces between the individual bubbles by separating the individual bubbles from each other by a distance which is about 3 or more bubble domain diameters. These methods try to substantially eliminate or minimize as much as possible the interaction forces between bubbles.

In a copending application to David Heinz, U.S. Ser. No. 81,232, now U.S. Pat. No. 3,735,145, assigned to the Assignee of the present invention, a magnetic bubble domain system comprising one or more channels or strips of magnetic bubble domain material on a supporting substrate is described. Any number of individual magnetic bubble domain channels may be interconnected or connected to a main channel. The movement of bubble domains along a channel or strip is effected by the repulsive or reaction forces between bubble domains which are present in a channel when a bubble domain is formed or propagated near another bubble domain. The movement of bubbles from a given channel into one of several possible adjoining channels to form a logic function may be directed by the presence or absence of bubbles in one or more connecting channels. This application is incorporated herewith by reference thereto.

The channel or strip of magnetic bubble domain described in the aforementioned patent application preferably is defined by etching two grooves completely through the thin film of magnetic bubble domain material, thereby providing a substantially isolated channel. This isolated channel has provided to be a substantial breakthrough in the field in contrast to the prior-art-type of systems described in the aforementioned patents. While these isolated-type channels are suitable for use in combination with a number of propagation systems, there are applications in which the isolated-type channel is not entirely satisfactory. The abrupt change in levels from the top of the channel to the adjacent surface may cause problems with metal overlays that are used therewith.

SUMMARY OF THE INVENTION

It is an object of this invention to provide an improved magnetic bubble domain system.

It is another object of this invention to provide an improved method for magnetic bubble domain manipulation.

It is another object of this invention to provide an improved magnetic bubble domain propagation system.

It is yet another object of this invention to provide an improved magnetic bubble domain channel system.

It is still another object of this invention to provide a magnetic bubble domain channel system suitable for use with metallic overlays.

These and other objects of this invention are accomplished by a magnetic bubble domain system in which the channels of thin film bubble domain material on a supporting substrate are defined by grooves extending a short distance into the film. The grooves extend into the magnetic bubble domain film to the extent of about 1 to 99 percent of the thickness of the film. The energy level of a bubble domain is lower in the channel portion of the film and higher in the film underneath the groove. As a result, the higher energy level of the magnetic bubble domain material below the groove acts as a restraining barrier to maintain the bubbles within the strip or channel within the grooves.

Other objects and advantages of this invention will be apparent from the following detailed description wherein a preferred embodiment of the present invention is clearly shown.

BRIEF DESCRIPTION OF THE DRAWING

The drawing shows a cross-sectional view of a magnetic bubble domain system in accordance with this invention.

DESCRIPTION OF AN ILLUSTRATIVE EMBODIMENT

In general, this invention describes a magnetic bubble domain system involving one or more channels of thin film bubble domain material on a supporting substrate. The channels are defined by grooves which extend into the magnetic bubble domain film to the extent of about 1 to 99 percent of the thickness of the film. Preferably, the depth of the grooves is about 5 to 25 percent of the film thickness.

As shown in the drawing, a monocrystalline substrate 10 has a thin film 12 of magnetic bubble domain material thereon. Preferably, the thin film 12 is formed by a chemical vapor deposition step. The deposition step is carried out in accordance with the copending patent application, Ser. No. 833,268, filed June 16, 1969, by Mee et al., and assigned to the Assignee of the present invention. This patent application is incorporated herewith by reference thereto.

The substrate 10 is preferably a monocrystalline garnet having a $J_3Q_5O_{12}$ formulation wherein the J constituent of the wafer formulation is at least one element selected from the group consisting of cerium, praseodymium, neodymium, promethium, samarium, europium, gadolinium, terbium, dysprosium, holmium, erbium, thulium, ytterbium, lutetium, lanthanum, yttrium, calcium, and bismuth; and the Q constituent of the wafer formulation is at least one element from the group consisting of indium, gallium, scandium, titanium, vanadium, chromium, manganese, rhodium, zirconium, hafnium, niobium, tantalum, aluminum, phosphorus, arsenic and antimony.

Examples of suitable substrate materials are $Y_{0.45}Gd_{2.55}Ga_5O_{12}$, $Ga_5O_{12}$, $Dy_{0.65}Gd_{2.35}Ga_5O_{12}$ and $Sm_3Ga_5O_{12}$.

The film strip or channel 12 of bubble domain material is, preferably, a single crystal garnet having a $J_3Q_5O_{12}$ formulation wherein the J constituent of the film formulation has at least one element selected from the group of cerium, praseodymium, neodymium, promethium, samarium, europium, gadolinium, terbium, dysprosium, holmium, erbium, thulium, ytterbium, lutetium, lanthanum, and yttrium; the Q constituent of the film formulation is taken from the group consisting of iron, iron and aluminum, iron and gallium, iron and indium, iron and scandium, iron and titanium, iron and vanadium, iron and chromium, and iron and manganese.

Preferred film materials are iron garnets such as $Y_3Ga_{1.2}Fe_{3.8}O_{12}$ and $Tb_3Fe_5O_{12}$.

The composite iron garnet film-substrate structure has a film with a given magnetostriction constant and a given difference between the lattic constants of the film and substrate. This requirement is discussed in detail in the copending patent applications U.S. Ser. No's. 101,785; 101,786; and 101,787 by Mee et al., now U.S. Pat. Nos. 3,728,152 3,745,046 and 3,788,896 respectively assigned to the common assignee, which are incorporated herewith by reference thereto.

While garnets are the preferred materials for the substrate and the thin film, other oxide materials may be used for the substrate, especially when the film is formed of an orthoferrite material.

Grooves 14, 14A, 14B and 14C are then formed in the film 12, preferably by chemical etching. Other methods such as sputter etching, laser machining and the like may be used. The groove 14 is etched a depth of about 1 to 99 percent of the thickness of the film 12. The preferred depth of the groove is between about 5 to 25 percent of the thickness of the film 12. Reducing the thickness of the film to form a groove will increase the energy required for a bubble to exist in that area under the groove, thereby causing the bubble to preferentially exist in the nonetched or nongrooved area.

Between the grooves 14 are the channels 16, 18, 20, 22 and 24. The channels 16, 18, 20, 22 and 24 have any desired pattern or geometry. A channel may be completely isolated from the other channels or it may be linked with one or more other channels; for example, channel 20 may be linked with channels 16, 18 and 24.

The energy level in the channels 16, 18, 20, 22 and 24 is lower than the energy level of the film 12 which is underneath the grooves 14, 14A, 14B and 14C. The higher energy level of the film 12 underneath the groove 14 acts as a restraining barrier to maintain the bubbles within the channels 16, 18, 20, 22 and 24. The energy level beneath the groove 14 is inversely proportional to the thickness, that is, the thicker the film underneath groove 14 the lower the energy level. For example, groove 14 which extends about 30 percent into the film 12 provides the film thereunder to have an energy level which is considerably higher than the film under groove 14A which extends into film 12 only about 25 percent.

Bubble domains which are generated in the individual channels 16, 18, 20, 22 and 24 are propagated or moved along these channels by conventional methods. The bubbles may be moved from one channel to another channel by connecting channels or passageways between the individual channels, for example, channel 16 can be connected to channel 18 by interrupting groove 14 with a channel (not shown) connecting channels 16 and 18.

In another embodiment of this invention, the channels may be connected by providing sufficient energy to the bubbles in one channel, for example channel 18, to overcome, that is exceed, the energy level below groove 14A to move the bubbles into channel 20. In this embodiment, it is desirable to have a relatively shallow groove such as the type shown in groove 14A and in which the depth would be of the order of 5 to 25 percent, preferably, of the depth of the film 12.

The depth of the grooves 14, 14A, 14B and 14C may be the same or one or more of the depths may be varied to fit the particular application. It is understood that the depth of each groove may go completely through the film 12 to the substrate 10 in accordance with the Heinz patent application previously referred to.

EXAMPLE I

A film of yttrium gallium iron garnet on a dysprosium gadolinium gallium garnet substrate was etched with hot phosphoric acid to provide two grooves extending into the film to a depth of about 50 percent of the film thickness. Bubble domains were then generated in the film. The grooves acted as a restraining barrier and confined the bubbles in the channel within the grooves.

In the claims:

1. A magnetic bubble domain system comprising:
- a non-magnetic substrate;
- a film of magnetic bubble domain material on said substrate; and
- a plurality of bubble domain energy barriers formed within said film, each of said barriers created by at least one groove extending partially through the thickness of said film toward said substrate for defining at least one bubble domain propagation channel in interposed regions of said film between adjacent barriers.

2. A magnetic bubble domain system as defined in claim 1 wherein said grooves extend into said film to about 5 to 25 percent of the thickness thereof.

3. A magnetic bubble domain system as defined in claim 1 wherein at least one of said grooves extends into said film to a depth different from that of the other grooves.

4. A magnetic bubble domain system comprising:
- a non-magnetic substrate;
- a film of monocrystalline garnet bubble domain material on said substrate;
- at least one bubble domain propagation channel defined in said film by a plurality of grooves extending partially through the thickness of said film.

5. A magnetic bubble domain system as defined in claim 4 wherein said grooves extend into said film to about 5 to 25 percent of the thickness thereof.

6. A magnetic bubble domain system as defined in claim 4, further comprising at least one passageway interconnecting at least two adjacent ones of said channels through interrupted sections of said grooves.

* * * * *

UNITED STATES PATENT OFFICE
CERTIFICATE OF CORRECTION

Patent No. 3,827,036 Dated July 30, 1974

Inventor(s) Cedric F. O'Donnell et al.

It is certified that error appears in the above-identified patent and that said Letters Patent are hereby corrected as shown below:

Column 1, line 49, change "provided" to -- proved --.

Column 2, line 62, delete "$Ga_5O_{12}$," (second occurrence).

Column 3, line 14, change "lattic" to -- lattice --.

Column 3, line 52, change "30" to -- 80 --.

Signed and sealed this 3rd day of December 1974.

(SEAL)
Attest:

McCOY M. GIBSON JR.
Attesting Officer

C. MARSHALL DANN
Commissioner of Patents